L. C. HARTSOCK.
CORN TESTER.
APPLICATION FILED APR. 26, 1918.
1,287,586.
Patented Dec. 10, 1918.
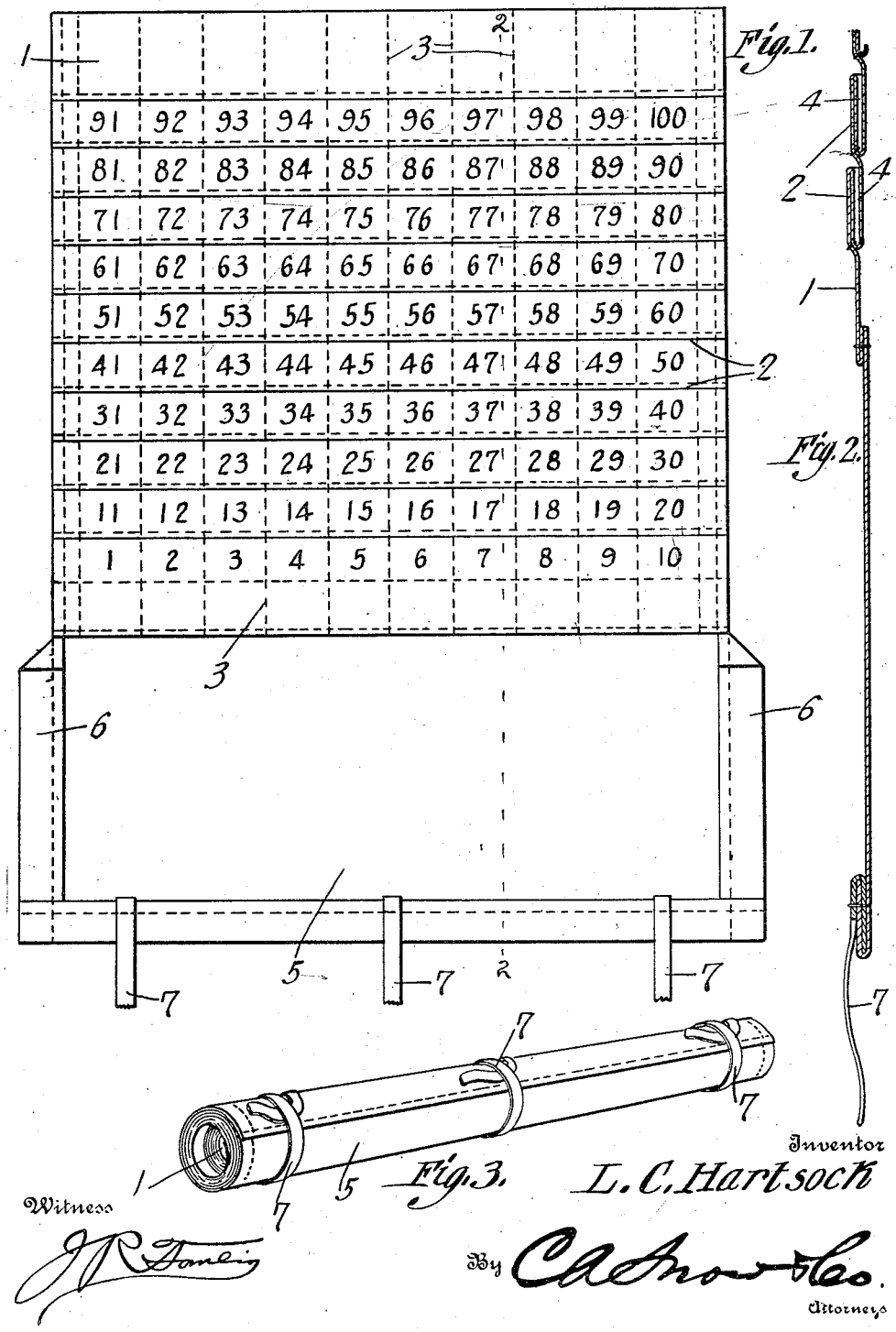

UNITED STATES PATENT OFFICE.

LUTHER C. HARTSOCK, OF SPRING VALLEY, OHIO.

CORN-TESTER.

1,287,586.

Specification of Letters Patent.

Patented Dec. 10, 1918.

Application filed April 26, 1918. Serial No. 230,933.

*To all whom it may concern:*

Be it known that I, LUTHER C. HARTSOCK, a citizen of the United States, residing at Spring Valley, in the county of Greene and State of Ohio, have invented a new and useful Corn-Tester, of which the following is a specification.

This invention relates to seed testers, one of its objects being to provide a flexible rack having separate pockets suitably indicated and which are designed to hold grains to be tested.

A further object is to provide a device of this character which is porous so as to hold moisture, there being a non-porous wrapper for inclosing the seed holding portions to prevent escape of the moisture while the germination is taking place.

Another object is to provide a device of this character which is simple in construction, cheap to manufacture, and which can be readily set up to receive the seeds and easily wrapped when filled.

With the foregoing and other objects in view which will appear as the description proceeds, the invention consists of certain novel details of construction and combinations of parts which will be hereinafter more fully described and pointed out in the claims it being understood that various changes may be made in the construction and arrangement of the parts without departing from the spirit or sacrificing any of the advantages of the invention as set forth in the appended claims.

In the accompanying drawings the preferred form of the invention has been shown.

In said drawings,

Figure 1 is a front elevation of the seed tester opened to receive the seeds.

Fig. 2 is an enlarged section through a portion thereof on line 2—2, Fig. 1.

Fig. 3 is a perspective view of the seed tester rolled up.

Referring to the figures by characters of reference, 1 designates a sheet of porous fabric provided with transverse folds 2 which are held in place by parallel rows of stitches 3 extending longitudinally of the device and dividing the folds into parallel rows of pockets, 4. On the outer surface of each pocket is printed or otherwise displayed a numeral, these numerals being arranged preferably in rotation,—in the present instance ranging from "1" to "100."

Secured to and extending from one end of the fabric 2 is a sheet of non-porous material, such as oilcloth, rubberized fabric, or the like, indicated at 5, this material being extended laterally to form projecting edges 6. Tapes 7 are fastened to the outer surface of the device and are designed to secure said device when rolled up.

In using the seed tester for testing corn a few kernels or grains are removed from an ear and placed in one of the pockets and a number corresponding with that on said pocket is placed on the ear. This procedure is followed until grains from a number of ears have been placed in different pockets. The device is then rolled up, beginning at the top, thus to force the seeds into the bottom portions of their respective pockets. The non-porous material will surround the seed containing portion and the rolled device is held compactly by tying the tapes 7 therearound. The rolled tester is then held with one end down, or vertically, and luke warm water is poured into the upper end of the rolled tester until thoroughly saturated after which the device is hung in a horizontal position where the temperature is satisfactory. After three or four days have elapsed the device can be unrolled and an inspection of the seeds will disclose which ears are sufficiently fertile.

While the device is especially adapted for use in testing corn, it can be employed for testing other seeds.

By providing the non-porous covering for the seed tester the moisture will not evaporate to an objectionable extent during the germination of the seeds, and by pressing in the laterally extending side edges of the non-porous portion the tester can be even more fully closed to prevent evaporation.

What is claimed is:—

1. A seed tester including a strip of material adapted to absorb moisture and having a plurality of transverse folds secured by longitudinal rows of stitches to provide separate seed receiving pockets, and a non-absorbent covering for said strip when rolled.

2. A seed tester including a strip of material adapted to absorb moisture and having a plurality of transverse folds secured by longitudinal rows of stitches to provide separate seed receiving pockets, said strip being adapted to be rolled to retain the seeds in the pockets, and a non-absorbent material at one end of said strip and constituting a covering for the strip when rolled.

In testimony that I claim the foregoing as my own, I have hereto affixed my signature in the presence of two witnesses.

LUTHER C. HARTSOCK.

Witnesses:
J. T. WALTON,
DAR WALTON.

Copies of this patent may be obtained for five cents each, by addressing the "Commissioner of Patents, Washington, D. C."